No. 888,876. PATENTED MAY 26, 1908.
O. W. DAVIS.
VARIABLE TRANSMISSION MECHANISM.
APPLICATION FILED JULY 22, 1907.
2 SHEETS—SHEET 2.
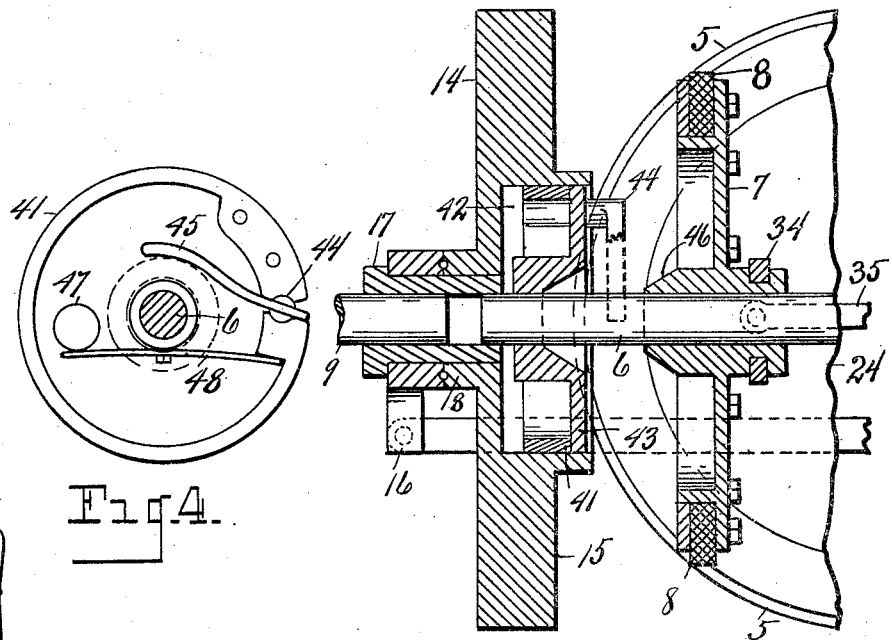
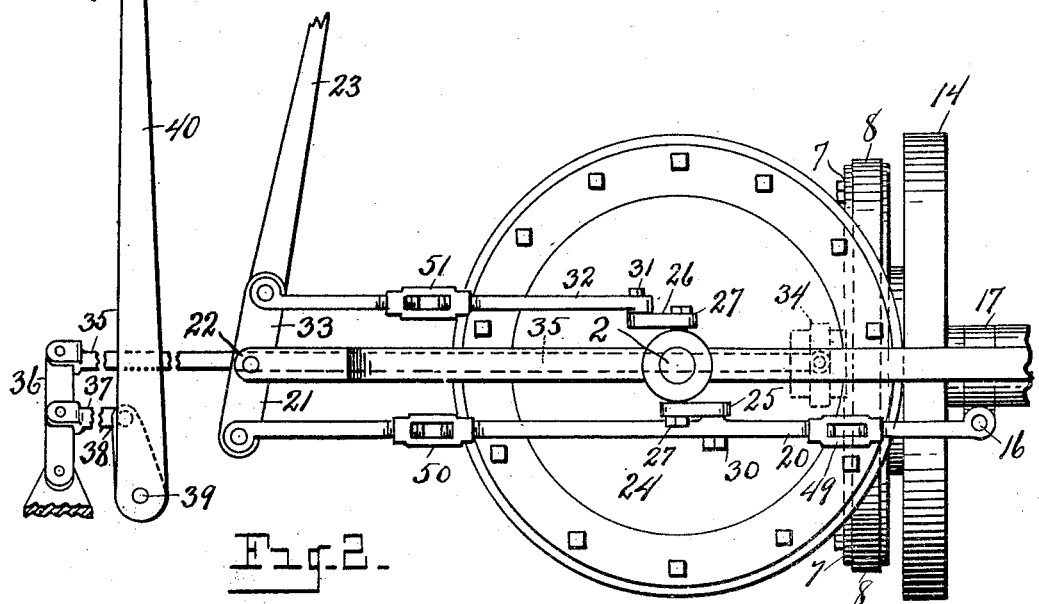
Witnesses
O. B. Baenziger
J. G. Howlett
Inventor
Orson W. Davis
By T. W. Wheeler & Co.
Attorneys

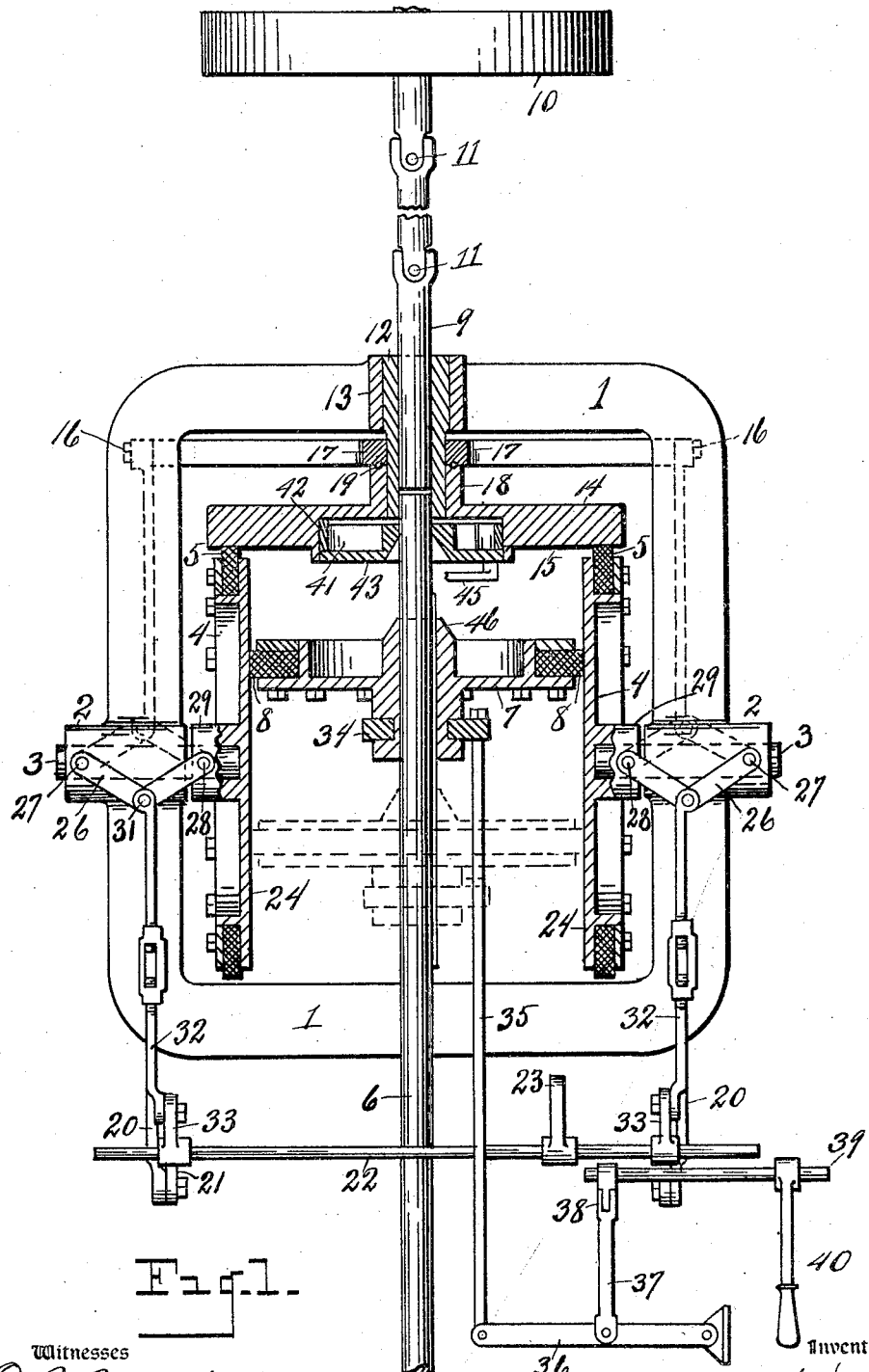

UNITED STATES PATENT OFFICE.

ORSON W. DAVIS, OF ROCHESTER, NEW YORK, ASSIGNOR TO GEARLESS TRANSMISSION CO., OF ROCHESTER, NEW YORK, A CORPORATION OF NEW YORK.

VARIABLE-TRANSMISSION MECHANISM.

No. 888,876.     Specification of Letters Patent.     Patented May 26, 1908.

Application filed July 22, 1907. Serial No. 385,014.

*To all whom it may concern:*

Be it known that I, ORSON W. DAVIS, a citizen of the United States, residing at Rochester, in the county of Monroe, State of New York, have invented certain new and useful Improvements in Variable-Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to variable speed transmission mechanism especially designed for use in connection with the propulsion of motor-driven vehicles, and consists in the construction and arrangement of parts hereinafter fully set forth and pointed out particularly in the claims.

The object of the invention is to provide simple and efficient means for transmitting the power from the motor to the driven shaft in a manner to enable said shaft to be driven directly or indirectly through a transmission mechanism which enables the speed to be varied at pleasure.

The above object is attained by the structure illustrated in the accompanying drawing, in which:—

Figure 1 is a plan view, partly in section, of my improved transmission mechanism. Fig. 2 is a side elevation thereof. Fig. 3 is a longitudinal section through the clutch, the slidable wheel on the motor shaft in which said clutch lies, and the slidable friction disk on the driven shaft adapted to actuate said clutch to connect said shafts directly. Fig. 4 is an elevation of the clutch mechanism.

Referring to the characters of reference, 1 designates a suitable frame in which the mechanism is mounted. Journaled in the boxes 2 on opposite sides of said frame are the short shafts 3 movable longitudinally through said boxes, and carrying upon their inner ends, the friction wheels 4, having peripheries 5 of suitable friction material.

Crossing the frame 1 between the friction wheels 4 is the driven shaft 6 which stands parallel with the vertical faces of said wheels and upon which is splined a friction disk 7 having a peripheral ring 8, of suitable friction material.

The motor or engine driven shaft 9 carries the ordinary fly wheel 10 and is provided with the universal joints 11 to afford facility of movement. The inner end of said shaft 9 is embraced by a sleeve 12 which is splined thereon and which is in turn supported in a journal-bearing 13 of the frame. The inner end of said sleeve extends through said bearing and has fixed thereon a wheel 14 having a friction face 15. The sleeve 12 extends onto the end of shaft 6, whereby the shafts 6 and 9 are supported in axial alinement although independently rotatable.

To bring the friction face 15 of the wheel 14 into contact with the peripheries of the wheels 4; the sleeve 12 carrying the wheel 14, is made to slide upon the shaft 9 by means of a cross bar 16, having a collar 17 which embraces said sleeve between the hub 18 of the disk 14 and the bearing 13 of said sleeve, there being rollers or bearing-balls 19 interposed between said hub and collar to afford a thrust bearing.

The cross bar 16 is actuated to slide the sleeve 12 longitudinally and carry the friction face of the wheel 14 against the peripheries of the wheels 4 by means of the rods 20 which are connected to the ends of said bar, and to the crank arms 21 on the rock shaft 22. Fixed to said rock shaft 22 is a lever 23 through the medium of which the shaft may be rocked to swing the crank arms 21 and draw upon the rods 20, thereby sliding the cross bar 16 and the sleeve 12 upon which the wheel 14 is mounted. When said wheel 14 is brought into engagement with the peripheries of the wheels 4, it is necessary at the same time to move the wheels 4 inwardly so as to cause their inner faces 24 to engage the periphery of the disk 7. This movement of the wheels 4 is accomplished by means of a lower set of toggle levers 25, and an upper set of toggle levers 26, the outer ends of which are pivoted at 27 to the upper and lower sides of the bearing boxes 2 and the inner ends of which are pivoted at 28 to the collars 29 which embrace the shafts 3 of the wheels 4 and bear against the hubs of said wheels, there being suitable thrust bearings between said hubs and collars. The lower set of toggle levers 25 is connected at 30 with the rods 20, and the upper set of toggle levers 26 is connected at 31 with the upper actuating rods 32 which are in turn connected to the crank arms 33 on the rock shaft 22. By this arrangement, the movement of the lever 23 which slides the wheel 14 into engagement with the peripheries of the wheels 4, also actuates said wheels 4 to carry them simultaneously into contact with the periphery of the disk 7, thereby driving the shaft 6 indirectly through the wheel 14, the wheels 4, and the disk 7.

By sliding the disk 7 across the faces of the wheels 4, any desired speed may be attained and by carrying said disk past the axis of the wheels 4, the shaft 6 may be driven in a reverse direction. The movement of the disk 7 is accomplished through the medium of a collar 34 which embraces the hub of said disk, and lies in a channel therein, and to which is attached an operating rod 35, which is in turn pivoted to a lever 36 which is connected to an arm 38 on the rock shaft 39, adapted to be actuated by a hand lever 40, whereby through the movement of said lever, the disk 7 may be caused to slide longitudinally upon the shaft 6 to vary the speed of said shaft or reverse the motion thereof.

Provision is made for driving the shaft 6 directly from the engine shaft 9 by means of an expansible ring or band clutch 41, shown more clearly in Fig. 4, which lies within a central recess 42 in the face of the wheel 14, and which at one of its ends is bolted to a disk 43 fixed to the end of the shaft 6. Between the opposite ends of the ring 41 is journaled a pin 44 which passes through the disk 43 and carries upon its outer end a spring arm 45, which when raised, will expand the ring and cause it to engage the annular wall of the recess 42, thereby forming a clutch connection between the shafts 6 and 9 which causes them to rotate in unison. The actuation of the spring arm 45 is accomplished by means of the projecting beveled hub 46 on the sliding disk 7, which, when said disk moves forward, is caused to engage said spring arm and actuate it to expand the clutch ring as before described. Mounted on the hub of the disk 43 and engaging with one end a stud 47 extending from said disk, is a spring bar 48, which with its other end engages one end of the ring 41 and whose tension is exerted to close said ring when the hub 46 of the disk 7 is withdrawn from engagement with the arm 45, thereby disengaging the clutch.

It will be noted that in the rods 20 between the toggle levers 25 and the cross bar 16, are turn-buckles 49 for the purpose of properly adjusting said rods with respect to the movement which it is desired to impart to said cross bar. It will also be noted that there is a second turn-buckle 50 in said rods between the cranks 21, to which their ends are attached and the toggle levers 25, for the purpose of regulating the throw of said levers. For a like purpose the rods 32 are provided with turn-buckles 51 whereby the throw of the toggle levers 26 may be regulated.

Having thus fully set forth my invention, what I claim as new and desire to secure by Letters Patent, is:—

1. In a frictional transmission mechanism, the combination of the motor shaft, a friction wheel movable axially thereon and rotatable therewith, a driven shaft in alinement with the motor shaft, a friction disk movable thereon and rotatable therewith, opposed friction wheels having plane faces adapted to engage the periphery of the friction disk on the driven shaft, means for moving the friction wheel on the motor shaft into engagement with the peripheries of the opposed friction wheels, means for moving said opposed friction wheels into engagement with the periphery of the disk on the driven shaft, and means for sliding said disk across the faces of said opposed wheels.

2. In a frictional transmission mechanism, the combination of the motor shaft, a friction wheel thereon mounted to slide longitudinally and to rotate therewith, a driven shaft in axial alinement with the motor shaft, a clutch for connecting said shafts directly, opposed friction wheels mounted to slide in a direction at right angles to the axis of the driven shaft, a friction disk mounted to slide upon the driven shaft and rotatable therewith, means for carrying the opposed friction wheels into contact with the periphery of said friction disk, means for carrying the friction wheel on the motor shaft into contact with the peripheries of said opposed friction wheels, means for sliding said disk across the faces of said wheels, and for operating said clutch.

3. In a frictional transmission mechanism, the combination of the motor shaft, a friction wheel rotatable therewith and slidable thereon, a driven shaft, a friction disk slidable on the driven shaft and rotatable therewith, opposed friction wheels movable into engagement with the periphery of said friction disk, and means for moving the friction wheel on the motor shaft into engagement with the peripheries of the opposed friction wheels when engaging with their faces the periphery of the slidable friction disk.

4. In a frictional transmission mechanism, the combination of the motor shaft, a friction wheel rotatable therewith and slidable thereon, a driven shaft, a friction disk splined upon the driven shaft, opposed friction wheels movable into engagement with the periphery of the friction disk, and means for simultaneously carrying the opposed friction wheels into engagement with said disk and the friction wheel on the motor shaft into engagement with the peripheries of said opposed friction wheels.

5. In a frictional transmission mechanism, the combination with the motor shaft, of the friction wheel rotatable therewith and slidable thereon, a driven shaft, a friction disk splined to the driven shaft, opposed friction wheels movable into engagement with the periphery of said friction disk, toggle levers for moving said opposed friction wheels, means for sliding the wheel on the motor shaft into engagement with the periphery of the opposed friction wheels, said means being connected with said toggle levers, and means for actuating said toggle levers.

In witness whereof, I sign this specification in the presence of two witnesses.

ORSON W. DAVIS.

Witnesses:
  O. B. BAENZIGER,
  I. G. HOWLETT.